No. 696,754. Patented Apr. 1, 1902.
D. F. ROGERS.
FOLDING ICE BOX.
(Application filed Dec. 14, 1901.)
(No Model.)

WITNESSES:
A. R. Appleman Jr.
Walton Harrison

INVENTOR
Daisy F. Rogers
BY
ATTORNEYS

THE NORRIS PETERS CO., PHOTO-LITHO., WASHINGTON, D. C.

UNITED STATES PATENT OFFICE.

DAISY FLORENCE ROGERS, OF LAKEWOOD, NEW JERSEY.

FOLDING ICE-BOX.

SPECIFICATION forming part of Letters Patent No. 696,754, dated April 1, 1902.

Application filed December 14, 1901. Serial No. 85,927. (No model.)

*To all whom it may concern:*

Be it known that I, DAISY FLORENCE ROGERS, a citizen of the United States, and a resident of Lakewood, in the county of Ocean and State of New Jersey, have invented a new and Improved Folding Ice-Box, of which the following is a full, clear, and exact description.

My invention relates to a folding ice-box of the kind suitable for the use of travelers and also of nurses who have charge of children.

Reference is to be had to the accompanying drawings, forming a part of this specification, in which similar characters of reference indicate corresponding parts in all the figures.

Figure 1:
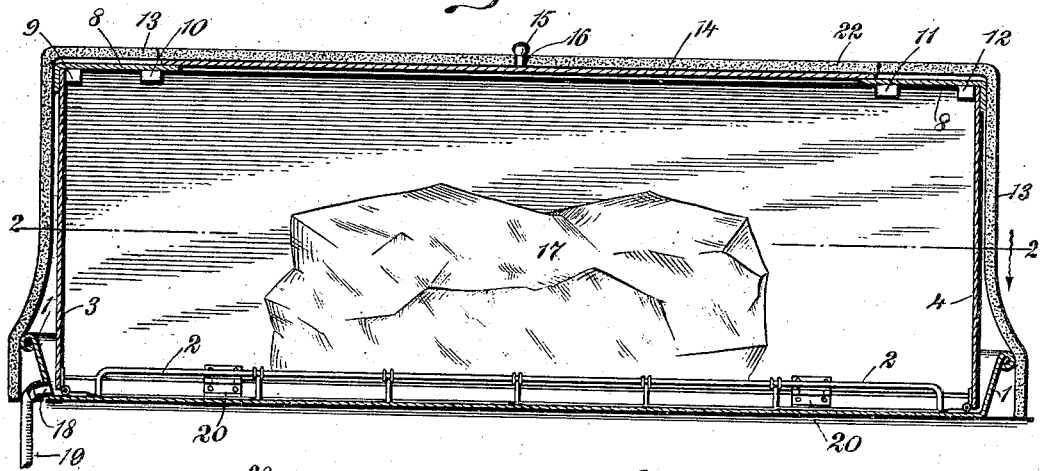
Figure 2:
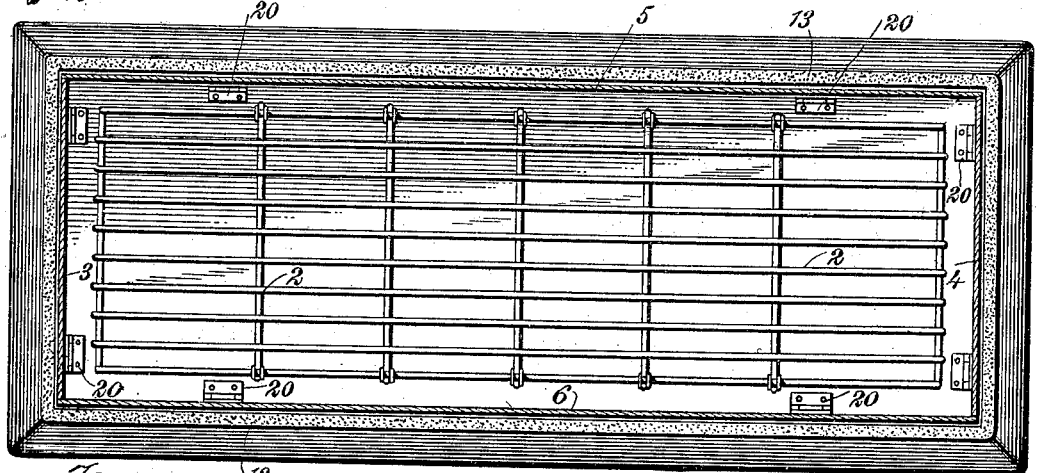

Figure 1 is a longitudinal section showing my device in use. Fig. 2 is a horizontal section on the line 2 2 of Fig. 1, and Fig. 3 is a section showing the principal parts of the device as folded.

A waterproof pan 1, preferably rectangular, is provided for the purpose of containing the folding parts. When the device is normally in use as an ice-box, a grid 2 loosely rests upon the bottom of the pan. This grid is easily removable to allow the end leaves 3 and 4 to be folded toward each other and the side leaves 5 and 6 to be folded upon the end leaves. The side leaf 5 (see Fig. 3) is hinged at a point 7 somewhat higher than the bottom of the pan in order to allow said leaf to fold parallel over the side leaf 6. A flanged top 8, having an opening and studded with beads 9 10 11 12 adjacent to the several corners thereof, is provided for the purpose of engaging the top edges of the leaves, and thereby holding the same securely in position. A jacket 13, preferably made of thick felt, is provided for the purpose of covering the box, and thereby preventing the entrance of heat from external sources.

A folding lid 14 covers the opening in the top 8, so as to be opened like the lid of a box. This lid is provided with a knob 15, which enters a slot 16 in a part of the jacket 13. By this arrangement the flap 22 of the jacket 13, corresponding in size and shape to the lid 14, is readily attached to and detached from said lid and is therefore readily movable therefrom by means of the knob 15.

Figure 3:
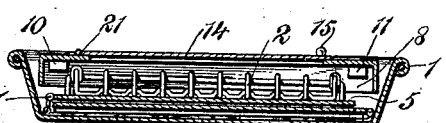

The pan 1 is provided with a drain-tube 18, normally engaging a rubber pipe 19 for the purpose of drawing off water from the several parts when folded in the position indicated in Fig. 3. The hinges upon which the side and end leaves are mounted are shown at 20. The lid 14 is hinged at 21, as indicated in Fig. 3. When desirable, however, the rubber pipe can be removed and the drain-pipe closed by a cork or stopper.

The operation of my device is as follows: Supposing that the parts are folded, as shown in Fig. 3, and that it is desired to use the apparatus as an ice-box, the top 8 is removed and the side and end leaves are unfolded. The grid is next placed in the position shown in Fig. 1, the top 8 is then firmly secured upon the upper edges of the leaves, the beads 9 10 11 12 being disposed so as to hold the leaves securely in position, and the ice 17 is next placed upon the grid and the lid is closed. The jacket 13 is next placed over the box-like member thus formed, the slot 16 in the flap 22 of said jacket being slipped over the knob 15. By this arrangement the felt flap 22 is held securely upon the lid 14, while the knob 15, projecting through the felt, may be used as a handle for raising both the lid and the flap of felt covering the same. A felt mat will also be placed under the ice-box for the protection of the table or any other piece of furniture on which the ice-box may be placed. The hinge 21 is of the ordinary type and enables the lid 14 to be raised.

When it is desired to pack the device away after use, the several parts are wiped dry and folded into the position shown in Fig. 3.

The ice can either be placed in the middle of the box or to one side thereof, so as to allow room for bottles and other articles to be kept cool.

Having thus described my invention, I claim as new and desire to secure by Letters Patent—

1. A folding ice-box, comprising a collapsible box-like member provided with a folding lid, a flexible jacket adapted to cover said member and provided with a folding flap corresponding to said lid, and means for detachably securing said lid and said flap together, so that said flap may be readily detached from said lid and said jacket may be easily removed from said box-like member.

2. A folding ice-box, comprising a collapsible box-like member having a folding lid provided with a knob, and a flexible jacket of non-conducting material for removably inclosing said member, said jacket having a loose flap provided with a hole for engaging said knob, the arrangement being such that said flap together with the lid of said box-like member is normally free to move relatively to said member, yet said jacket is readily removable from said member.

3. A folding ice-box, comprising a waterproof pan, side and end leaves mounted therein and flexibly secured to the bottom thereof, a flanged top provided with an opening and with beads for engaging said side and end members, and a folding lid flexibly mounted upon said top so as to cover said opening, said parts normally constituting a collapsible box-like member, and a jacket of non-conducting material for covering said box-like member, said jacket being provided with a loose flap corresponding to the lid of said box-like member and detachably secured to said lid so as to fold therewith, yet readily detachable therefrom so that said jacket can be removed from said box-like member.

4. A folding ice-box, comprising a waterproof pan provided with a drain-tube, folding leaves hinged directly to the bottom of said pan, a removable ice-grid normally resting on the bottom of said pan, and a detachable top provided with beads for temporarily securing said leaves together at the corners thereof, the arrangement being such that said grid may be removed, said leaves folded upon each other, said grid placed upon said leaves, and said top laid upon said grid, whereby all movable parts of said apparatus will occupy said pan and be drained simultaneously.

In testimony whereof I have signed my name to this specification in the presence of two subscribing witnesses.

DAISY FLORENCE ROGERS.

Witnesses:
W. W. LEARY,
B. H. FIELDER.